(12) United States Patent
Jiang et al.

(10) Patent No.: US 8,446,022 B2
(45) Date of Patent: May 21, 2013

(54) SHOCK ABSORBING SYSTEM FOR ENERGY RECYCLING

(75) Inventors: Joe-Air Jiang, Taipei (TW); Wei-Sheng Su, Taipei (TW); Yu-Cheng Yang, Taipei (TW); Cheng-Long Chuang, Taipei (TW); Tzu-Shiang Lin, Taipei (TW)

(73) Assignee: National Taiwan University, Taipei (TW)

( * ) Notice: Subject to any disclaimer, the term of this patent is extended or adjusted under 35 U.S.C. 154(b) by 330 days.

(21) Appl. No.: 12/900,396

(22) Filed: Oct. 7, 2010

(65) Prior Publication Data

US 2011/0278856 A1 Nov. 17, 2011

(30) Foreign Application Priority Data

May 17, 2010 (TW) ................................ 99115731 A

(51) Int. Cl.
*H02K 7/00* (2006.01)
(52) U.S. Cl.
USPC .............................................. 290/1 R; 74/34

(58) Field of Classification Search
USPC ........................................................... 290/1 C
See application file for complete search history.

(56) References Cited

U.S. PATENT DOCUMENTS

| | | | | |
|---|---|---|---|---|
| 3,944,855 | A | * | 3/1976 | Le Van ............................ 310/69 |
| 3,981,204 | A | * | 9/1976 | Starbard ............................ 74/34 |
| 4,090,413 | A | * | 5/1978 | Vickland ................. 74/665 GB |
| 4,907,474 | A | * | 3/1990 | Bolger ............................ 475/14 |
| 6,982,497 | B2 | * | 1/2006 | Rome ........................... 290/1 A |
| 7,361,999 | B2 | * | 4/2008 | Yeh ................................ 290/1 R |
| 2003/0034652 | A1 | * | 2/2003 | Slatkin ......................... 290/1 R |
| 2007/0089919 | A1 | | 4/2007 | de la Torre et al. |
| 2009/0256363 | A1 | * | 10/2009 | Okamoto ..................... 290/1 R |

FOREIGN PATENT DOCUMENTS

| | | | | |
|---|---|---|---|---|
| GB | 2065983 | A | * | 7/1981 |
| KR | 2003056694 | A | * | 7/2003 |
| TW | M284604 | | | 1/2006 |

* cited by examiner

*Primary Examiner* — Joseph Waks

(57) ABSTRACT

A shock absorber includes a resilient element; a gear set comprising a first non-return gear and a second non-return gear; and an electric generator driven by the first non-return gear to generate a power when the resilient element is compressed and driven by the second non-return gear when the resilient element is loosened.

7 Claims, 8 Drawing Sheets

SHOCK ABSORBING SYSTEM FOR ENERGY RECYCLING

FIELD OF THE INVENTION

The invention is related to a shock absorbing system, and more particularly to a dual-direction shock absorbing system for retrieving mechanical energy sourced from displacements of elastic element therein and transforming it into electric energy.

BACKGROUND OF THE INVENTION

There is usually a shock absorber disposed in a vibrating absorber or a damper that is installed in vehicles, transportations or buildings, for absorbing/dissipating the kinematic energy resulted from vibrations or quakes and maintaining safety and comfort for people on/in the vehicles, transportations or buildings. A shock absorber typically consists of mechanical viscous dampers and elastic elements. The state of the art already provides abundant techniques that well utilize the kinematic energy sourced from the compressions and relaxations of the spring or the elastic elements.

For instances, the Taiwan Utility Model Pat. No. M284604 discloses an electric generating apparatus with a shock absorber, which utilizes the gravitational energy sourced from the displacements of the absorber to drive a series of gears. However, the mentioned electric generating apparatus is only capable to retrieve the energy sourced during the compressing phase of the spring, but fails to retrieve the energy during the expanding period of the spring. The published US Patent Application No. 2007/0089919 discloses an apparatus and a method for converting the relative movements occurring between a vehicle and wheels thereof into electricity for recharging a battery of the vehicle. The apparatus includes a generator provided on the vehicle, a linear-to-rotary motion converter connected between the vehicle and the wheels thereof and a rotor connected to a electric machine of the generator. Reciprocating movements of the wheel relative to the vehicle body are converted by the motion converter to drive the rotor activating the electric machine which can produce electricity for recharging the battery of the vehicle. However, the rotations of the rotor are unstable since the reciprocating movements of the wheel are essentially a random-based motion, which causes the electrical current unstable and reduces the life for the battery.

Although currently there are many kinds of shock absorbers that are developed for utilizing/collecting the energy generated during the reciprocating movements of the elastic element. However, the issues regarding the low efficiency of energy retrieving and unstable electrical current are urged to be resolved or improved. Therefore, in view of the drawbacks in the prior art, a novel shock absorber is thus provided.

SUMMARY OF THE INVENTION

In this invention, a shock absorbing system for energy recycling is provided. The system includes a set of non-return gears and a generator module. The non-return gears are mainly utilized to render the shaft of the generator rotating in the same direction for stably collecting the electric energy, regardless of the shock absorbers being compressed and rebounded. The generator is capable to generate DC power.

In accordance with the first aspect of the present invention, a shock absorber is provided. The shock absorber includes a resilient element; a gear set comprising a first non-return gear and a second non-return gear; and an electric generator driven by the first non-return gear to generate a power when the resilient element is compressed and driven by the second non-return gear when the resilient element is loosened.

Preferably, the gear set further includes a gear rack driven by the resilient element, a spur gear driven by the gear rack, a bevel gear driven by the spur gear and a first and a second non-return gears driven by the bevel gear.

Preferably, the spur gear and the bevel gear have a first shaft and the first and the second non-return gears have a second shaft.

Preferably, the gear set further includes a flywheel coaxially disposed on the second shaft.

Preferably, the gear set and the electric generator are in one of two states being disposed in an inner space formed by the resilient element and disposed separately from the resilient element.

Preferably, one of the gear set and the electric generator is disposed in an inner space formed by the resilient element.

Preferably, each of the first and the second non-return gears includes a one-way bearing, so that when the first non-return gear is rotated, the rotation of the second non-return gear is ineffectual, and when the second non-return gear is rotated, the rotation of the first non-return gear is ineffectual.

Preferably, the rotation of the second non-return gear is ineffectual when the resilient element is compressed and the rotation of the first non-return gear is ineffectual when the resilient element is loosened.

Preferably, the resilient element is a spring.

In accordance with the second aspect of the present invention, a shock absorber device is provided. The shock absorbing device includes a reciprocator having a first moving direction and a second moving direction; a first one-way gear and a second one-way gear; and a power generator driven by the first one-way gear when the reciprocator is moved toward the first moving direction and driven by the second one-way gear when the reciprocator is moved toward the second moving direction.

In accordance with the third aspect of the present invention, a shock absorber device is provided. The shock absorbing device includes a resilient reciprocator having motions on a first direction and a second direction; a one-way gear set driven by the motions; and a power generating device driven by the gear set.

Other objects, advantages and efficacy of the present invention will be described in detail below taken from the preferred embodiments with reference to the accompanying drawings, in which:

Figure 4A:
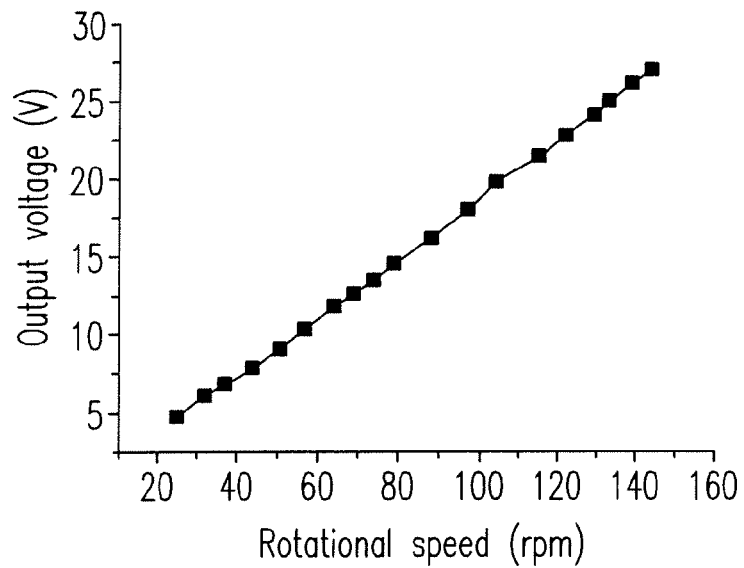
Figure 4B:
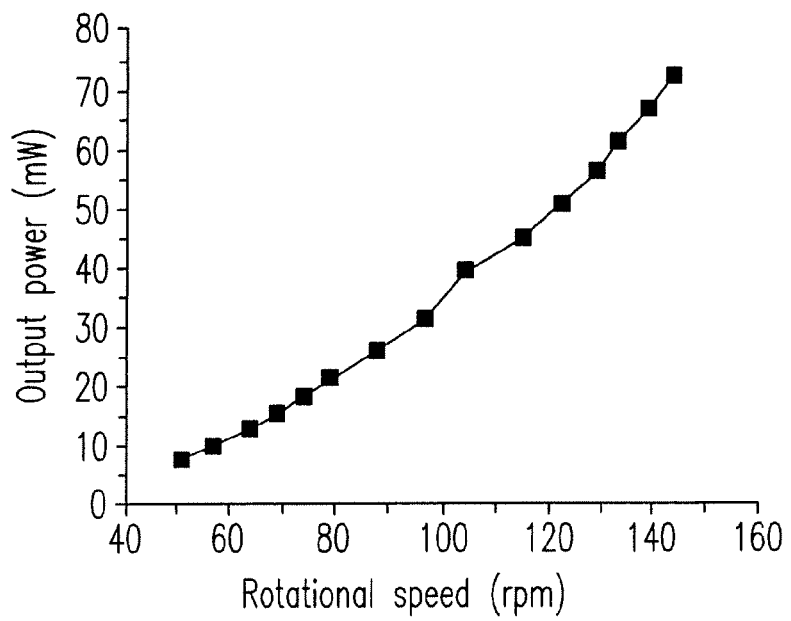
Figure 5:
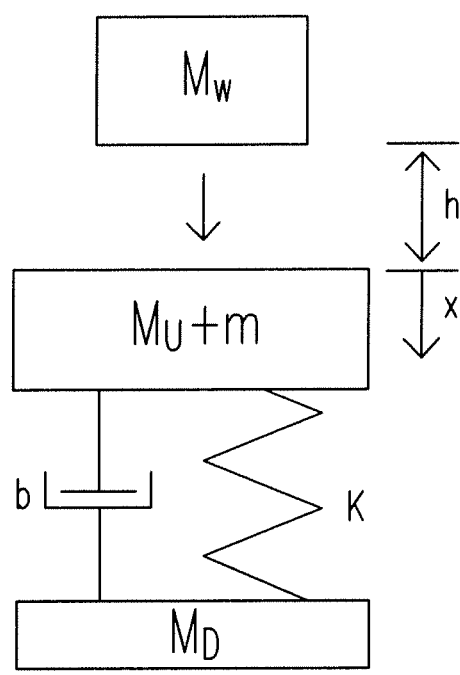
Figure 6A:
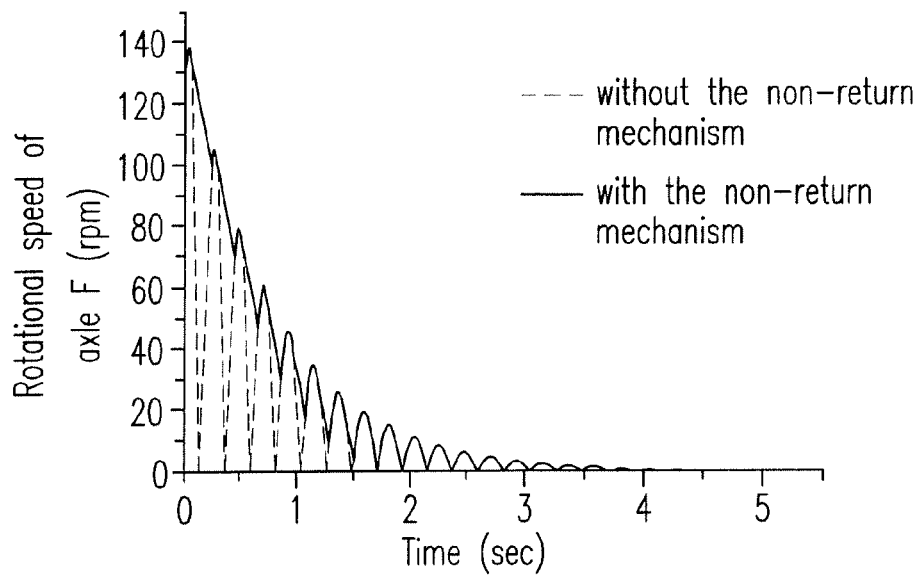
Figure 6B:
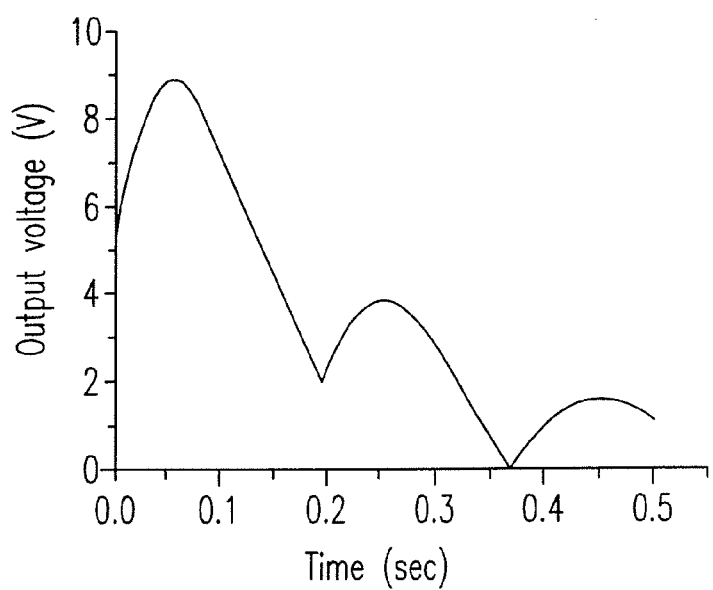
Figure 7A:
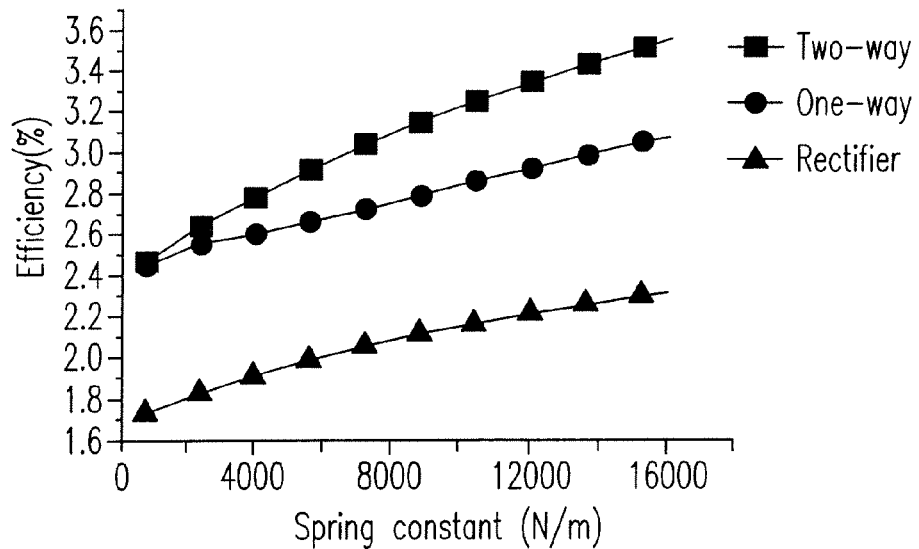
Figure 7B:
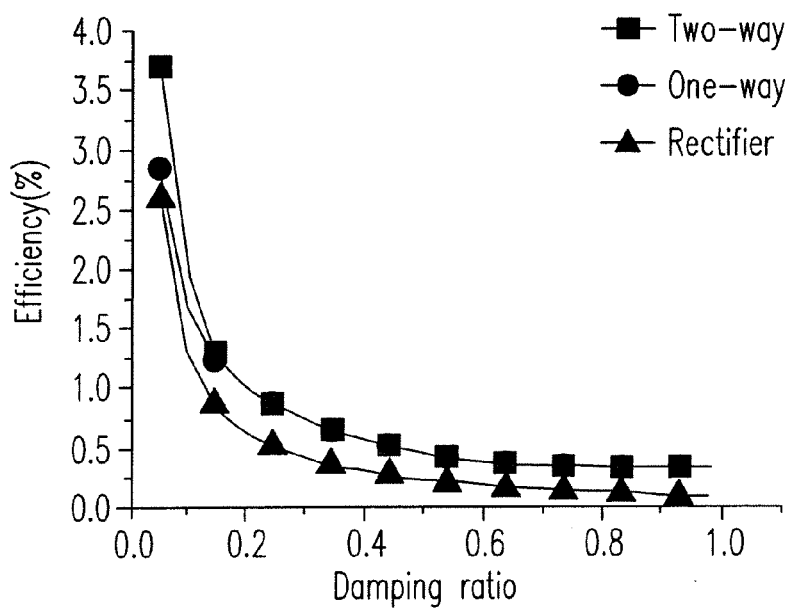
Figure 7C:
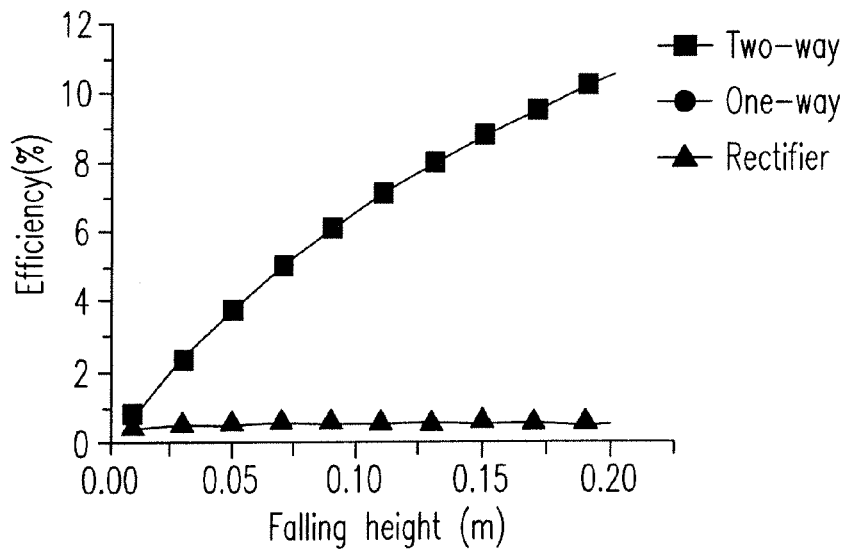
Figure 7D:
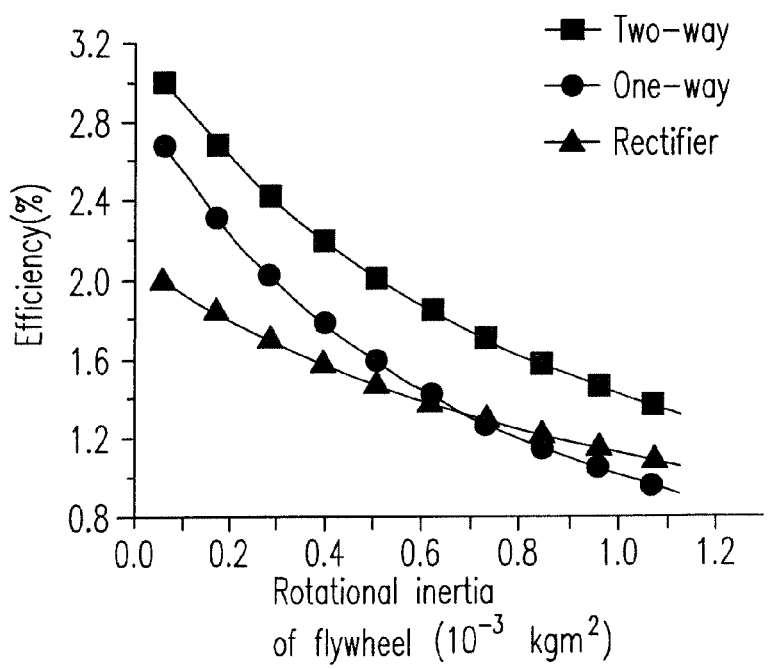

FIG. (3) is a side view diagram illustrating the gear set according to the present invention;

FIG. 4(a) is a diagram illustrating the relationship between the output voltage of the generator and the rotational speed of the shaft according to the present invention;

FIG. 4(b) is a diagram illustrating the relationship between the output power of the generator and the rotational speed of the shaft according to the present invention;

FIG. 5 is a schematic diagram illustrating the mechanical model of the gear set according to the present invention;

FIG. 6(a) is a diagram illustrating the relationship between the rotational speed of the shaft and time according to the present invention;

FIG. 6(b) is a diagram illustrating the relationship between the output voltage and time according to the present invention;

FIG. 7(a) is a diagram illustrating the relationship between the efficiency and the spring constant according to the present invention;

FIG. 7(b) is a diagram illustrating the relationship between the efficiency and the damping ratio according to the present invention;

FIG. 7(c) is a diagram illustrating the relationship between the efficiency and the falling height according to the present invention; and FIG. 7(d) is a diagram illustrating the relationship between the efficiency and the rotational inertia of flywheel according to the present invention.

DETAILED DESCRIPTION OF THE PREFERRED EMBODIMENT

The present invention will now be described more specifically to the following embodiments. However, it is to be noted that the following descriptions of preferred embodiments of this invention are presented herein for the purposes of illustration and description only; it is not intended to be exhaustive or to be limited to the precise form disclosed.

Figure 1:
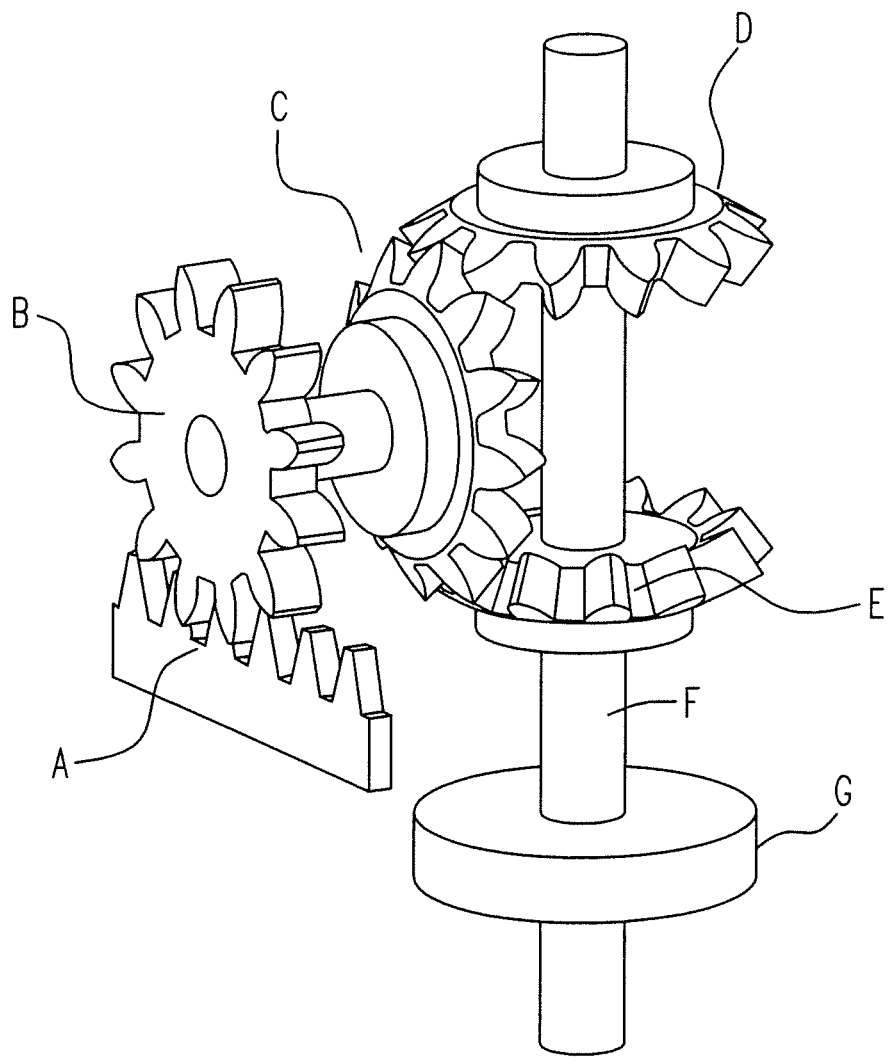
FIG. 1 is a diagram illustrating the first embodiment for the gear set according to the present invention.

Please refer to FIG. 1, which is a diagram illustrating the first embodiment for the gear set according to the present invention. In FIG. 1, the gear rack A is engaged with the spur gear B. Since the spur gear B and the bevel gear C are coaxially disposed on the same shaft, the bevel gear C will be driven by the spur gear B when the spur gear B is revolved. The bevel gear C is engage with the first non-return gear D and the second non-return gear E respectively. Since the first non-return gear D and the second non-return gear E are coaxially disposed on the same shaft F and each of the first non-return gear D and the second non-return gear E has a one-way bearing, only one of the first non-return gear D and the second non-return gear E is correspondingly driven by the bevel gear C, while the bevel gear C is revolved. That is, the first non-return gear D and the second non-return gear E do not together revolve in the same direction at the same time. In this first embodiment, there is a flywheel G disposed on the shaft F that is driven by the first non-return gear D or the second non-return gear E and utilized for raising and providing the rotating inertia to the shaft F, so as to increase the integral period of rotation and stabilizing the electric generation process, while the shaft F is rotating.

Figure 2A:
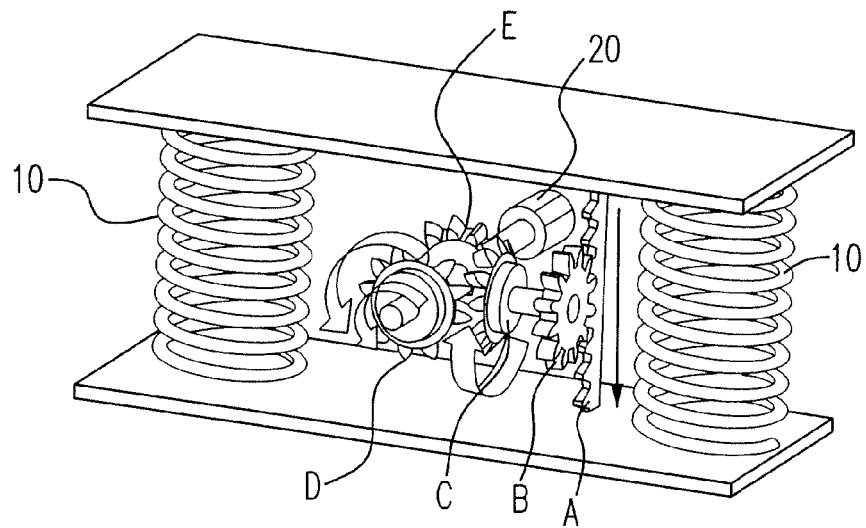
FIG. 2(a) is a diagram illustrating a compressing state of the shock absorber according to the present invention.
Figure 2B:
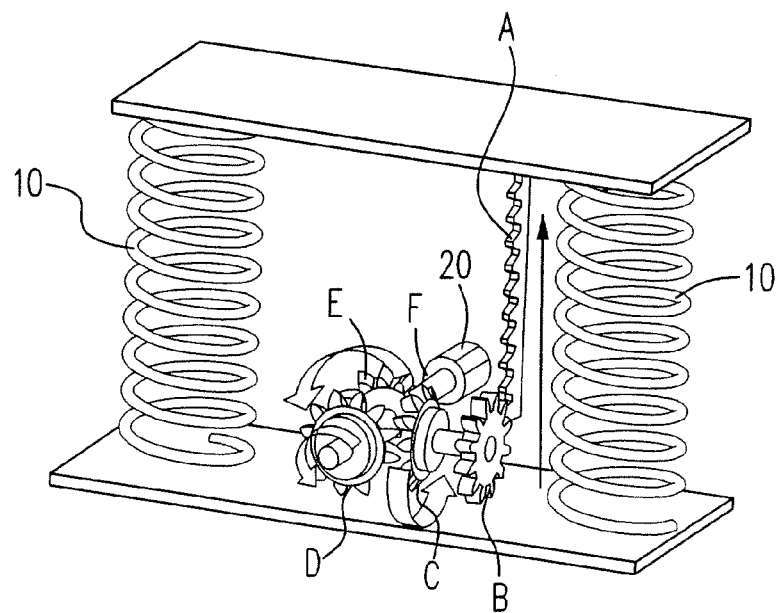
FIG. 2(b) is a diagram illustrating a loosening state of the shock absorber according to the present invention.

Please direct to FIG. 2(a) and FIG. 2(b), which are diagrams respectively illustrating a compressing state and a loosening state of the shock absorber according to the present invention. In FIG. 2(a), while the spring 10 (resilient element) is compressed, the spur gear B is driven by the gear rack A that moves toward the same direction with the squeezing direction resulted from the mentioned compression and then the bevel gear C is driven by the spur gear B. Consequently, the bevel gear C drives the first non-return gear D and the second non-return gear E to revolve in a counterclockwise direction and a clockwise direction respectively. Since there is a one-way bearing disposed in the second non-return gear E, the second non-return gear E revolves in a clockwise direction but in ineffectual which does not provide power to the shaft F or drive the shaft F revolved, while the first non-return gear D revolves in a counterclockwise direction in effectual which provides power to the shaft F and effectually drives the shaft F revolved in counterclockwise direction. Briefly, the first non-return gear D effectually rotates in the gear D direction $R_D$ (the counterclockwise direction) whereby the shaft F is accordingly revolved in the output direction $R_F$ (the counterclockwise direction) for further activating the electric generator 20 to generate electric.

In FIG. 2(b), while the spring 10 is loosened, the spur gear B and the bevel gear C is sequentially driven by the gear rack A that moves toward the same direction with the elongated direction resulted from the mentioned looseness. At the mean time, the bevel gear C drives the first non-return gear D and the second non-return gear E to revolve in a clockwise direction and a counterclockwise direction respectively. Since there is a one-way bearing disposed in the first non-return gear D, the first non-return gear D revolves in a clockwise direction but in ineffectual which does not provide power to the shaft F or drive the shaft F revolved, while the second non-return gear E revolves in a counterclockwise direction in effectual which provides power to the shaft F and effectually drives the shaft F revolved in counterclockwise direction. Briefly, the second non-return gear E effectually rotates in the gear E direction $R_E$ (the counterclockwise direction) whereby the shaft F is accordingly revolved in the output direction $R_F$ (the counterclockwise direction) for further activating the electric generator 20 to generate electric.

Hence, no matter whether the spring is compressed or loosened, by which only one of the first non-return gear D and the second non-return gear E is effectually driven to rotate in the output direction $R_F$ (for instance, the counterclockwise direction in this first preferred embodiment) for activating the electric generator 20 to generate electric. That is, while the first non-return gear D is effectually rotated, the second non-return gear E is ineffectual, and vice versa, which ensures the shaft F always rotating in the same direction (clockwise or counterclockwise). Therefore, the electric generator 20 can be stably activated to steadily generate electric power.

Figure 3:
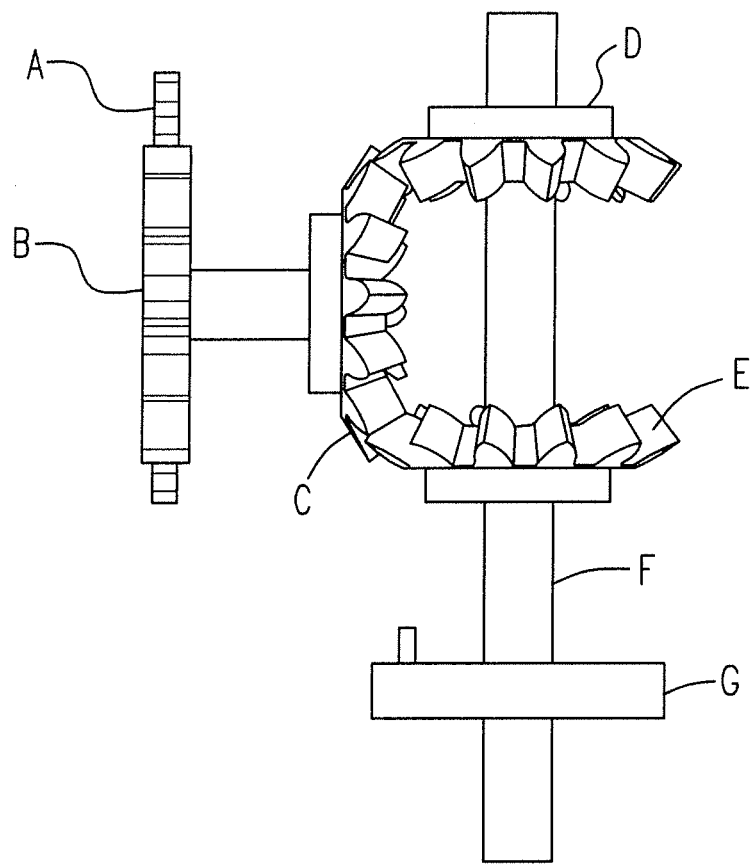

Please direct to FIG. 3), which is a side view diagram illustrating the gear set according to the present invention. The dynamic is transferred from the fear rack A, the spur gear B, the bevel gear C to one of the first non-return gear D and the second non-return gear E sequentially.

The generated energy is in association with the rotational speed of shaft F. The rotational speed of the shaft F is determined by the equation as follows:

$$\omega_B(t) = \frac{V_A(t)}{R_B}, \tag{1}$$

where $V_A(t)$ is the velocity of gear rack A, $R_B$ is the radius of the spur gear B and $\omega_B(t)$ is the rotational speed of the spur gear B. The rotational speeds of the first non-return gear D and the second non-return gear E is respectively calculated by the equation as follows:

$$\omega_D(t) = R_B V_A(t) \frac{n_C}{n_D} \text{ and } \omega_E(t) = R_B V_A(t) \frac{n_C}{n_E}, \tag{2}$$

where $\omega_D(t)$ is the rotational speed of the first non-return gear D, $\omega_E(t)$ is the rotational speed of the second non-return gear E, $n_C$ is the numbers of teeth of the bevel gear C, and $n_D$ and $n_E$ are the numbers of teeth of the first non-return gear D and the second non-return gear E, respectively.

In the first preferred embodiment of the present invention, a direct current (DC) motor (model: CG-309A, manufactured by Photonic company) is utilized as an electric/power generator. It is conducted an experiment to test the output power of the generator. The relationship between the rotational speed of the shaft F and the output voltage of the generator is shown in FIG. 4(a). FIG. 4(b) illustrates the relationship between the rotational speed of the shaft F and the output power of the generator. The output voltage and the output power increase when the input rotational speed of the shaft F accelerates.

The shock absorbing system for energy recycling is able to be simplified as a bundle of an equivalent spring, an equivalent damping and the non-return gears. The proposed system is a secondary order dynamic model, and the mechanical model of the proposed system is shown as FIG. 5. In the simulation, the clearance among gears can be ignored. Moreover, the collision in the simulation is the perfectly elastic collision when the object hits the plate. Hence, the acceleration of the gravity is the only factor needed to be considered. The dynamic characteristic equation of the system can be computed by the following equations:

$$(m + M_U + M_W)\frac{d^2x}{dt^2} + b\frac{dx}{dt} + kx = F_{ext} = M_W g, \quad (3)$$

$$\frac{1}{\omega_n}\frac{d^2x}{dt^2} + \frac{2\xi}{\omega_n}\frac{dx}{dt} + x = \frac{1}{k}F_{ext} = \frac{M_W g}{k}, \quad (4)$$

where m is the equivalent mass caused by gears system, b is the damping ratio, k is the spring constant, $M_U$ is the mass of the plate, $M_W$ is the mass of the falling object, $F_{ext}$ is the input of an external force, g is the acceleration of the gravity, h is the distance between the object and the plate before the object falls, x is the position of the plate, and $\omega_n=\sqrt{k/(m+M_U+M_W)}$ and $\xi=b/2\sqrt{k(m+M_U+M_W)}$. In Eq. (4), when t=0, the object hits the plate. The simulation model can be demonstrated as follows:

$$x(0) = X_0, \quad M_W g = kX_0, \quad v_A(0) = \frac{M_w\sqrt{2gh}}{(M_w + M_U + m)}. \quad (5)$$

The spring is compressed by the object that hits the plate, and the final position is set at zero. $X_0$ is the length of compression, and g is the acceleration of the gravity. If the system is underdamped, the position of the plate is able to be demonstrated by Eq. (6) as:

$$x(t)=e^{-\xi\omega_n t}[\alpha \cos(\omega_n\sqrt{1-\xi^2}t)+\beta \sin(\omega_n\sqrt{1-\xi^2}t)] \quad (6),$$

then take the first order derivative of x in Eq. (6) with respect to t, as:

$$\frac{dx_A(t)}{dt} = v_A(t) = \begin{pmatrix} -\xi\omega_n e^{-\xi\omega_n t}[\alpha\cos(\omega_n\sqrt{1-\xi^2}\,t) + \\ \beta\sin(\omega_n\sqrt{1-\xi^2}\,t)] + \\ e^{-\xi\omega_n t}[-\alpha\omega_n\sqrt{1-\xi^2}\sin(\omega_n\sqrt{1-\xi^2}\,t) + \\ \beta\omega_n\sqrt{1-\xi^2}\cos(\omega_n\sqrt{1-\xi^2}\,t)] \end{pmatrix}, \quad (7)$$

and subsequently, applies Eq. (5) to Eqs. (6) and (7), as:

$$\alpha = X_0 \text{ and } \beta = \frac{X_0\xi\omega_n - \frac{M_w\sqrt{2gh}}{(M_w + M_u + m)}}{\omega_n\sqrt{1-\xi^2}}. \quad (8)$$

Because the non-return gears D and E can transform the velocity of the gear rack A into a specific direction rotation, the rotation speed of the shaft F is the absolute value of Eq. (2):

$$\omega_F(t) = |\omega_D(t)| = \left|\frac{n_C}{R_B n_D}V_A(t)\right|. \quad (9)$$

Please refer to FIGS. 6(a) and 6(b), which are diagrams illustrating the relationship between the rotational speed of the shaft and time according to the present invention and the relationship between the output voltage and time according to the present invention respectively. In FIGS. 6(a) and 6(b), the solid line represents the relationship between $\omega_F$ and t with the non-return mechanism and the dash line represents the relationship between $\omega_F$ and t without the non-return mechanism. If the velocity of the gear rack A is too slow, the bevel gear C cannot drive the non-return gears D and E. The torque of the generator $\tau_F$ will resist the first non-return gear D, the second non-return gear E and the shaft F. Thus, in FIG. 6(a), for the system with non-return gears mechanism, the rotational speed of shaft F will slowly and periodically decrease and dissipate. As to the system without non-return gears mechanism, the rotational speed of shaft F will fast cease and bounce back to the original speed periodically. Hence, it is apparent that the rotation output of the shaft of the shock absorber having the non-return mechanism outputs is much stable than the system without the non-return mechanism and further provides a stable electricity generation process thereby.

In the experiment, the shock absorber illustrated in FIGS. 2(a), 2(b) and FIG. 5 are adopted and an object having weight as 15.57 kg is placed above the plate with 0.01 meters. When the object falls onto the plate, the springs are compressed according to the impact of the plate. Springs are then extended according to the potential elastic energy of the springs. Using the proposed non-return gears, the springs are able to drive the shaft of the generator when they are compressed and extended in the same rotational direction. The other experimental parameters are shown in Table 1 as follows and applied to Eq. (7) and Eq. (9). For example, $n_C/n_D$ is set as 2, $R_B$ is set as 0.04 m and h is set as 0.01 m.

TABLE 1

Experimental parameters of the shock absorbing system

| parameter | value | unit |
| --- | --- | --- |
| spring constant, k | 8040 | N/m |
| damping ratio, b | 733.6 | N·s/m |
| mass of the falling object, $M_W$ | 15.57 | kg |
| ratio of teeth, $n_C/n_D$ | 2 | |
| radius of the spur gear B, $R_B$ | 0.04 | m |
| the falling height, h | 0.01 | m |
| rotational inertia of the gear B, $I_B$ | $3.22 \times 10^{-4}$ | kg·m² |
| rotational inertia of the gear C, $I_C$ | $1.96 \times 10^{-3}$ | kg·m² |
| rotational inertia of the gear D, $I_D$ | $2.99 \times 10^{-4}$ | kg·m² |
| rotational inertia of the gear E, $I_E$ | $2.99 \times 10^{-4}$ | kg·m² |
| rotational inertia of the gear F, $I_F$ | $2.08 \times 10^{-4}$ | kg·m² |

The simulation results are demonstrated as FIG. 6(b) and FIGS. 7(a) 7(d) and please direct thereto. FIG. 6 (b) is a diagram illustrating the relationship between the output voltage and time according to the present invention; FIG. 7(a) is a diagram illustrating the relationship between the efficiency and the spring constant according to the present invention; FIG. 7(b) is a diagram illustrating the relationship between the efficiency and the damping ratio according to the present invention;

FIG. 7(c) is a diagram illustrating the relationship between the efficiency and the falling height according to the present invention; and FIG. 7(d) is a diagram illustrating the relationship between the efficiency and the rotational inertia of flywheel according to the present invention.

In this experiment, the efficiency of the proposed system is compared with one-way method (Ye, 2005) and rectifier method (Choi et al., 2001). The output power of three methods is according to different input rotational speed of shaft F respectively. The each efficiency of energy recycled by above three mentioned methods is calculated by integral the area under the line of output power when the shock absorber was impacted once by the external force. The parameters of the simulation in three methods are same as the experiment. Three methods of efficiency are compared when the proposed systems adjusted the parameters including spring constant, damping ratio, the falling height of the falling object and the rotational inertia of flywheel.

FIG. 7(a) illustrates the recycling efficiency simulated by adjusted spring constant. Each recycling efficiency of the systems increases with the spring constant. When the spring constant is at about 12000 N/m, the efficiency of two-way method is approximately 3.35%, which is extra 51.1% higher than the one-way method and rectifier method. FIG. 7(b) illustrates the recycling efficiency simulated by adjusted damping ratio. The recycling efficiency of the difference between three methods is very close. Therefore, the damping ratio has little influence on the efficiency of different methods. However, while damping ratio is at about 0.78, the efficiency of two-way method is still 2.3 times higher than the rectifier method.

FIG. 7(c) illustrates the recycling efficiency simulated by adjusted falling height. There is little influence on the recycling efficiency of the rectifier method except the other methods. On the contrary, the efficiency of the two-way and one-way methods is very close and increases with the falling height. While falling height is at about 15 cm, the efficiency of the two-way and one-way methods is 14.5 times higher than the rectifier method. FIG. 7(d) illustrates the recycling efficiency simulated by adjusted rotational inertia of flywheel. The recycling efficiency decreases as the rotational inertia of flywheel is increased. While the rotational inertia of flywheel is about $0.675 \times 10^{-3}$ kgm$^2$, the efficiency of two-way method is approximately extra 32.6% higher than one-way method and rectifier method.

In conclusion, under different parameters of condition, the recycling efficiency of two-way method is better than the others. It is because the proposed non-return gears of two-way method are able to drive the shaft of the generator when the springs are compressed and extended and the flywheel of the system maintains the shaft in high rotational speed. However, to rectify the alternating current, the bridge rectifier reduces the voltage and energy recycled by the rectifier method.

To sum up, this invention has proposed a shock absorbing system for energy recycling. The invention improves the recycling efficiency when the springs are vibrated. In the invention, the proposed non-return gears are able to drive the shaft of the generator when the springs are compressed and loosened. Compared with other methods recycling the vibrating energy, the experimental results and simulation indicate that the proposed system efficiently generates energy when the springs vibrate. Furthermore, the proposed system with a rectifying circuit can integrated into an actual shock absorber in vehicles or motorcycles. The energy will be more efficiently used in this system.

Based on the above descriptions, while the invention has been described in terms of what are presently considered to be the most practical and preferred embodiments, it is to be understood that the invention should not be limited to the disclosed embodiment. On the contrary, it is intended to cap numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. A shock absorber, comprising:

a resilient element;

a gear set comprising a gear rack driven by the resilient element, a spur gear driven by the gear rack, a bevel gear driven by the spur gear, and a first non-return gear and a second non-return gear driven by the bevel gear, wherein the spur gear and the bevel gear have a first shaft and the first and the second non-return gears have a second shaft; and an electric generator driven by the first non-return gear to generate a power when the resilient element is compressed and driven by the second non-return gear when the resilient element is loosened.

2. The shock absorber according to claim 1, wherein the gear set further comprises a flywheel coaxially disposed on the second shaft.

3. The shock absorber according to claim 1, wherein the gear set and the electric generator are in one of two states being disposed in an inner space formed by the resilient element and disposed separately from the resilient element.

4. The shock absorber according to claim 1, wherein one of the gear set and the electric generator is disposed in an inner space formed by the resilient element.

5. The shock absorber according to claim 1, wherein each of the first and the second non-return gears comprises a one-way bearing, so that when the first non-return gear is rotated, the rotation of the second non-return gear is ineffectual, and when the second non-return gear is rotated, the rotation of the first non-return gear is ineffectual.

6. The shock absorber according to claim 5, wherein the rotation of the second non-return gear is ineffectual when the resilient element is compressed and the rotation of the first non-return gear is ineffectual when the resilient element is loosened.

7. The shock absorber according to claim 1, wherein the resilient element is a spring.

* * * * *